US010259201B2

(12) United States Patent
Vissing et al.

(10) Patent No.: US 10,259,201 B2
(45) Date of Patent: Apr. 16, 2019

(54) ASSEMBLY WITH TEMPORARY PROTECTIVE FILM

(71) Applicant: FRAUNHOFER-GESELLSCHAFT ZUR FOERDERUNG DER ANGEWANDTEN FORSCHUNG E.V., Munich (DE)

(72) Inventors: Klaus-Dieter Vissing, Thedinghausen (DE); Matthias Ott, Dohren (DE); Gregor Grassl, Stade (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/396,850

(22) PCT Filed: Apr. 26, 2013

(86) PCT No.: PCT/EP2013/058705
§ 371 (c)(1),
(2) Date: Feb. 25, 2015

(87) PCT Pub. No.: WO2013/160437
PCT Pub. Date: Oct. 31, 2013

(65) Prior Publication Data
US 2015/0266276 A1   Sep. 24, 2015

(30) Foreign Application Priority Data
Apr. 27, 2012  (DE) .......................... 10 2012 207 149

(51) Int. Cl.
| B05D 1/00 | (2006.01) |
| B05D 5/08 | (2006.01) |
| B32B 5/18 | (2006.01) |
| B29C 33/68 | (2006.01) |
| B29C 37/00 | (2006.01) |
| B29C 63/00 | (2006.01) |
| B32B 27/08 | (2006.01) |
| B32B 27/30 | (2006.01) |
| B32B 27/36 | (2006.01) |
| B32B 27/38 | (2006.01) |
| B32B 27/40 | (2006.01) |
| B32B 37/12 | (2006.01) |
| B32B 37/26 | (2006.01) |

(52) U.S. Cl.
CPC ................ *B32B 27/08* (2013.01); *B05D 1/62* (2013.01); *B29C 33/68* (2013.01); *B29C 37/0075* (2013.01); *B29C 63/0017* (2013.01); *B32B 5/18* (2013.01); *B32B 27/306* (2013.01); *B32B 27/36* (2013.01); *B32B 27/38* (2013.01); *B32B 27/40* (2013.01); *B32B 37/12* (2013.01); *B32B 37/26* (2013.01); *B05D 5/08* (2013.01); *B29C 63/0056* (2013.01); *B32B 2037/268* (2013.01); *B32B 2250/02* (2013.01); *B32B 2250/24* (2013.01); *B32B 2255/10* (2013.01); *B32B 2255/26* (2013.01); *Y10T 428/249991* (2015.04); *Y10T 428/269* (2015.01); *Y10T 428/31511* (2015.04); *Y10T 428/31598* (2015.04); *Y10T 428/31663* (2015.04)

(58) Field of Classification Search
CPC ......... B32B 27/08; B32B 27/40; B32B 27/36; B32B 27/38; B32B 2037/268
See application file for complete search history.

(56) References Cited

U.S. PATENT DOCUMENTS

| 4,038,340 | A | * | 7/1977 | Frank ................... C09D 167/06 525/40 |
| 5,639,416 | A | * | 6/1997 | Pennisi .................. B29C 33/50 249/139 |
| 2002/0009604 | A1 | * | 1/2002 | Zamora ................... A61L 29/08 428/450 |
| 2004/0192142 | A1 | * | 9/2004 | Zafiroglu ................. B32B 5/08 442/352 |
| 2008/0032136 | A1 | * | 2/2008 | Vissing ............... B29C 33/3857 428/411.1 |
| 2009/0197078 | A1 | * | 8/2009 | Vissing .............. B01D 67/0088 428/336 |
| 2010/0239783 | A1 | * | 9/2010 | Mao ....................... B29C 33/58 427/578 |

FOREIGN PATENT DOCUMENTS

| DE | 10 2004 026 479 | 12/2005 |
| DE | 10 2006 018 491 | 10/2007 |
| DE | 10 2007 010 071 | 9/2008 |
| WO | WO 2007/118905 | 10/2007 |

* cited by examiner

*Primary Examiner* — Hai Vo
(74) *Attorney, Agent, or Firm* — Preti Flaherty Beliveau & Pachios LLP

(57) ABSTRACT

The invention relates to a composite comprising (i) a plastics component or (ii) a semifinished plastics product with a protective layer system, where the protective layer system comprises a plastics film and an organosilicon plasma polymer layer, the organosilicon plasma polymer layer is arranged between the (i) plastics component or the (ii) semifinished plastics product and the plastics film and, after the hardening of the (i) plastics component or of the (ii) semifinished plastics product, the organosilicon plasma polymer layer adheres more securely to the plastics film than to the (i) plastics component or the (ii) semifinished plastics product.

21 Claims, No Drawings

ASSEMBLY WITH TEMPORARY PROTECTIVE FILM

The invention relates to a composite comprising a (i) plastics component or (ii) a semifinished plastics product with a protective layer system, where the protective layer system comprises a plastics film and an organosilicon plasma polymer layer. The invention further relates to the use of a temporary protective film as release aid with respect to the mold or between mold and plastics component to be produced in a plastics-shaping process, and to a process for the production of a composite comprising a plastics component and a temporary protective film.

After production of many high-specification plastics components, in particular plastics moldings, and in particular moldings made of fiber-reinforced plastics, they are provided with a protective film in order by way of example to protect them from soiling or damage during transport. Self-adhesive films are often used for this purpose, in order to provide the desired adhesion and thus the functionality. The molds in the shaping process for plastics moldings, and in particular moldings made of fiber-reinforced plastics, are moreover provided with external release agents to aid demolding. After demolding, these remain on the plastics molding and on the mold surface. A complicated procedure is therefore often required to free the moldings and the molds from the residues of release agent, with resultant losses of surface quality. For this reason, the moldings are sometimes then subjected to a very complicated coating procedure.

When fiber-composite components are manufactured, for example with the aid of preimpregnated semifinished products (such as preimpregnated fibers (prepregs), or preimpregnated copper mesh for lightning protection), and also when non-preimpregnated semifinished products are used, e.g. in the infusion process, it is necessary to ensure that, after the thermal hardening of the resin, the component can be removed from a mold. Another requirement for handling purposes and/or during the production process (on the roll) is a release layer or a release film to separate the individual layers of the prepregs from one another and/or from the equipment. These release films or release papers are removed before the preimpregnated products are placed in the release-treated mold.

DE 10 2006 018 491 A1 and WO 2007/118905 A1 [flexible plasma polymer products, corresponding items, production process, and use] disclose an item comprising or composed of a plasma polymer product composed of carbon, silicon, oxygen, and hydrogen, and also optionally of usual impurities where, on calibration to the aliphatic C 1s peak at 285.00 eV in the ESCA spectrum of the plasma polymer product, when comparison is made with a trimethylsiloxy-terminated polydimethylsiloxane (PDMS) with kinematic viscosity 350 mm$^2$/s at 25° C., and density 0.97 g/mL at 25° C., the chemical shift of the binding energy value of the Si 2p peak is at most 0.44 eV toward higher or lower binding energies, and the chemical shift of the binding energy value of the O 1s peak is at most 0.50 eV toward higher or lower binding energies.

Because of the extensibility of said plasma polymer coating it is said to be possible to provide an appropriate anti-adhesive surface or easy-clean surface to flexible products such as films (in particular extensible films). Said plasma polymer coating is also said to be amenable to use as release layer or part of a release layer on a mold surface— but nothing is said as to whether a release film can be produced by appropriate coating of a polymer film.

Said plasma polymer product is also said to be used as protective film that can be peeled to leave no residue, in particular for an optical component of a lithographic system. In this context it is said that the plasma polymer product can also be a constituent of a protective film. However it is clear from the description text that the latter means a self-supporting plasma polymer film.

In DE 10 2007 010 071 A1 [Schichtverbund umfassend eine Lack-und eine Trennschicht sowie Lack-Träger-Anordnung zur Übertragung von Lack] [Layer composite comprising a layer of coating material and a release layer, and coating-material-carrier arrangement for the transfer of coating material], the use of the plasma polymer product of DE 10 2006 018 491 A1 is described for the transfer of coating material. Here, coating material is said to be introduced, on a carrier film thus plasma-polymer-coated, into a mold, and fibers and/or resin and fibers and/or resin are applied to the layer of coating material and can be bonded thereto for example by hardening. It is said here that the extensible film can remain on the release layer on removal from the mold. In this case it is also said to serve as additional protection for the layer of coating material, from which it can easily be removed if desired. However, said document discloses the abovementioned plasma polymer product only as transfer layer—on peeling of the film the plasma polymer coating therefore remains on the other coating material. This can also be undesirable. In this connection it is also said, on removal from the mold, the carrier film can also remain, as additional protection for the layer of coating material, on the release layer.

In DE 10 2004 026 479 A1 [Release coating for the replication of surfaces] a transfer coating (in particular a plasma polymer coating) is likewise described, inter alia for other coating materials. No detailed information is provided there about the composition of the plasma polymer coating.

It has been found that when the layer preferred in DE 10 2006 018 491 A1 is used as release layer on a flexible film it leads to a release film that does not provide fully satisfactory adhesion for a temporary protective film, because its adhesion is too low for the protective-film use.

It was therefore an object of the present invention to provide a film product which can be used not only as thermally stable release film but also as protective film in the plastics processing sector with defined adhesion to the component. In particular, it should preferably be possible to remove the protective film from a (hardened) plastics component or semifinished plastics product to leave no residue, but at the same time the adhesion of the protective film should be sufficiently great that its use can resemble that of a self-adhesive film. It is moreover preferable that the protective film can also be used as release aid in shaping processes, i.e. as release aid between mold and a plastics component that is being produced.

The invention achieves said object via a composite comprising (i) a plastics component or (ii) a semifinished plastics product with a protective layer system, where the protective layer system comprises a plastics film and an organosilicon plasma polymer layer, the organosilicon plasma polymer layer is arranged between the (i) plastics component or the (ii) semifinished plastics product and the plastics film and, after the hardening of the (i) plastics component or of the (ii) semifinished plastics product, the organosilicon plasma polymer layer adheres more securely to the plastics film than to the (i) plastics component or the (ii) semifinished plastics product.

The protective layer system here involves a protective film where an organosilicon plasma polymer layer arranged toward the substrate (plastics component or semifinished plastics product) is used to adjust adhesion to the substrate in such a way as to permit removal to leave no residue after the hardening of the plastics component or of the semifinished plastics product.

The carbon content of preferred organosilicon plasma polymer layers in this context is at least 2.5 atom %, measured by XPS on the side facing away from the substrate and based on the elements N, C, Si, and O in the layer as 100 atom %.

A semifinished plastics product in this application text is a plastics product which has not yet been entirely hardened. Its shape can still therefore be altered before it is introduced into a hardening process, for example using heat or radiation. It is then a plastics component in the sense of (i).

The meaning of the expression "after hardening" is that the plastics component, or a component manufactured from a semifinished plastics product, is in the usual ready-to-use condition. The hardening here is preferably achieved thermally. The hardening here is achieved in a manner appropriate to the material, in such a way as to avoid any detriment to the functionality of the material, e.g. resulting from excessive embrittlement.

Surprisingly, it has been found to design a composite of the invention in a manner that allows the protective layer system made of organosilicon plasma polymer layer and plastics film, together forming the protective film, to leave very substantially no residue when peeled from a plastics component or from a plastics component produced from a semifinished plastics product. In particular, it has been found possible here to design the system in such a way that the organosilicon plasma polymer layer does not restrict the desired properties of the protective film, which derive from the plastics film, or at most restricts these to an insignificant extent. Examples of these properties are windability and formability.

A plasma polymer layer is deposited here by a conventional plasma polymer process from the gas phase, preferably onto the plastics film. In this connection it is very particularly preferable that the plasma polymer layer is produced with the aid of siloxane-containing compounds as precursors, most preferably with hexamethyldisiloxane (HMDSO).

For further information about plasma polymer layers, and plasma polymer layers that are in particular preferred, reference may be made to the abovementioned application DE 10 2007 010 071 A1, and in particular here to the first paragraph on page 6.

It is moreover generally preferable that the intermediate organosilicon plasma polymer layer is applied first to the plastics film. This can—in turn preferably—be achieved in a web-product-coating process: the organosilicon plasma polymer layer can provide a cost-effective method of adjusting the adhesion behavior (or the release behavior) of the plastics film used on the plastic to be protected (plastics component or semifinished plastics product).

As described above, the adhesion values are adjusted in a manner that allows peeling from the plastics component to leave (substantially) no residue, after the hardening of the protective layer system, i.e. mechanical release causes adhesive fracture between the hardened polymer system and the organosilicon plasma polymer layer.

Preference is given to a composite of the invention where the atomic ratios measured by means of XPS (preferably on that side of the organosilicon layer that faces away from the plastics film) are $$1.00 \leq n(O + N):n(Si) \leq 2.20$$
$$1.20 \leq n(C):n(Si) \leq 2.00$$
$$0.70 \leq n(C):n(O + N) \leq 2.00,$$

and particularly preferably $$1.25 \leq n(O):n(Si) \leq 2.10$$
$$1.60 \leq n(C):n(Si) \leq 2.00$$
$$0.80 \leq n(C):n(O) \leq 1.80.$$

In case of doubt, XPS (X-ray Photoelectron Spectroscopy) and ESCA (Electron Spectroscopy for Chemical Analysis) is carried out in equipment as stated in example 2 of this application.

Particularly effective intermediate organosilicon plasma polymer layers for release property adjustment can be produced within the range of said atomic ratios. It is also possible here to combine the particularly preferred atomic ratio ranges for individual pairs of elements with the ranges that are merely preferred.

It is particularly preferable that the organosilicon plasma polymer layer is composed of ≥90 atom % of the elements C, Si, O, and N, where there is no concomitant measurement of hydrogen, and the analysis is achieved by means of XPS. It is further preferable that the organosilicon plasma polymer layer is composed of ≥95 atom % of said elements, and very particularly preferably of ≥99 atom %, where the analysis is achieved by means of XPS, and the values exclude hydrogen.

Preference is given to a composite of the invention in which, based on the entirety of the elements silicon, oxygen, nitrogen, and carbon as 100 atom % the following applies to values measured by means of XPS on the organosilicon plasma polymer layer:

| | |
|---|---|
| silicon | from 17 to 27 atom % |
| (oxygen + nitrogen) | from 26 to 50 atom % |
| carbon | from 25 to 50 atom %. | and preferably:

| | |
|---|---|
| silicon | from 19 to 26 atom % |
| oxygen | from 30 to 45 atom % |
| carbon | from 33 to 48 atom %. |

It is preferable here that the measurement is made on the side facing away from the plastics film.

Particularly suitable organosilicon plasma polymer layers for the use in this invention have been found within these absolute atomic ranges.

Preference is given in the invention to a composite where the thickness of the organosilicon plasma polymer layer is ≤2 µm, preferably ≤0.5 µm, and particularly preferably ≤0.2 µm.

With these thicknesses it is possible to exert a useful influence on release properties in the plastics film without any adverse effect on mechanical properties thereof for the purposes of the intended use.

Preference is given in the invention to a composite of the invention where the plastics film is composed of a thermoplastic elastomer, preferably selected from the group consisting of a thermoplastic elastomer, preferably selected from the group consisting of thermoplastic polyester elastomers (TPE-E); thermoplastic copolyesters (TPC), in particular polyetheresters; crosslinked thermoplastic elastomers based on olefins (TPE-V/TPV), in particular mixtures of polypropylene and ethylene-propylene-diene rubber (EPDM/PP); thermoplastic elastomers based on urethanes (TPE-U/TPU); mixtures of natural rubber and polypropylene (NR/PP); mixtures of nitrile rubber and polypropylene (NBR/PP), and mixtures of ethylene-vinyl acetate and polyvinylidene chloride (EVA/PVDC), or a thermoplastic polymer, preferably selected from the group consisting of polyolefin, in particular polymethylpentene (PMP), and also polyolefin copolymers; polyamide, in particular nylon-6,6, and also poly-$\varepsilon$-caprolactam; polyethylene terephthalate (PET), and polyimide (PI).

These films have particularly good suitability, depending on the intended use, for providing a protective effect.

In this connection it is particularly preferable that the protective layer system of the invention is windable and/or formable. It is further preferable that the protective layer system of the invention is also (vacuum-)formable at room temperature.

"Formable" means for the purposes of this text a tensile stress at break, at 50% tensile strain, of less than 50 MPa, and a tensile strain at break of at least 150% (measured in accordance with DIN EN ISO 527).

In this connection "windable" means that the protective layer system can be wound onto a roll with diameter ≤30 cm, preferably ≤20 cm, and particularly preferably ≤10 cm, and can remain in this condition for at least 24 hours without any substantial losses in any of the mechanical qualities of the protective layer system, and in particular without any longlasting deformation.

Preference is given in the invention to a composite where the (i) plastics component or (ii) semifinished plastics product is, at least on the side directed toward the organosilicon plasma polymer layer, preferably entirely composed of a material selected from the group consisting of thermoset; thermoplastic; matrix resin for fiber-composite plastics (hardened for (i), not hardened for (ii), in particular based on epoxy resin, on polyurethane resin, on polyester resin, on vinyl ester resin, or on phenolic resin; plastics foam; coating material in particular applied as gel coat, and adhesive.

The materials preferred for the plastics component are particularly suitable for the use in combination with the protective layer system of the invention.

Preference is further given to a composite of the invention comprising a plastics component where the plastics component has been produced by a process selected from the group consisting of injection molding; reaction injection molding (RIM); foaming; processes for the production of fiber-composite materials, in particular based on carbon fibers, glass fibers, other inorganic fibers or polymer fibers, preferably (vacuum) infusion, manual lamination, injection processes, particularly preferably resin transfer molding RTM, liquid resin press molding, pray layup, prepreg processes; in-mold-coating processes, and lamination, in particular for producing a composite with wood, metal, or plastic.

It has been found that the protective layer system to be used in the invention, made of plastics film and of organosilicon layer, can be used in a wide variety of plastics molding applications. It has proven particularly advantageous here that—with a suitable selection of material—the protective layer system can be placed into the appropriate molds for the plastics molding process (and can optionally be adapted appropriately by way of a forming process), thus eliminating any requirement for the use of a release agent on the mold surface. It is nevertheless also possible to use release agents or lubricants, and at least in the region of the component there is then no requirement for separate cleaning to remove these, because they are removed concomitantly on removal of the protective film, and the film prevents any transfer to the component.

Particular preference is given here to the use of a composite of the invention for what is known as the prepreg process and on a lightning protection matrix composite, preferably a copper matrix composite.

Preference is given to a composite of the invention where the softening point of the plastics film is ≥100° C., preferably ≥140° C., more preferably ≥180° C.

A relatively high softening point makes the plastics film (also in combination with the organosilicon layer) particularly suitable for plastics molding processes in which the plastic is exposed to heat.

Preference is given in the invention to a composite of the invention comprising a semifinished plastics product which has not yet entirely hardened.

This material, in particular the material for what is known as the prepreg process, involves semifinished plastics product delivered in the form of web product. The protective layer of the invention here can separate the individual layers of the web product from one another (e.g. in the wound-up condition), and thus protect them from undesired adhesion. On production of plastics moldings from said semifinished material it is possible that the film remains provided to the lower layer of the material introduced into the mold, so that the film can exert a release effect in relation to the mold. It is, of course advisable that the protective layer system of the invention covers only the region of contact of the semifinished product with the mold, whereas the protective layer system between the semifinished product layers that are to be fused to one another to give the finished plastics molding must, of course, be removed before the hardening process.

Preference is given to a composite of the invention where the composite is a web product, preferably a windable web product.

For the definition of "windable", reference is made to the definition above.

It is preferable here that the composite of the invention comprises a semifinished plastics product which has not yet been entirely hardened.

This type of semifinished plastics product can by way of example be used in prepreg processes, and the composite of the invention therefore provides a number of particular advantages, for example easy handling, and possible use in shaping processes without any separate release aid.

Preference is given in the invention to a composite of the invention where the material for the plastic (of the plastics component or the semifinished plastics) is a fiber-composite plastic. This material can be used to produce plastics moldings with high specific strength.

Preference is further given in the invention to a composite of the invention where the composite comprises a layer of coating material adjacent to the organosilicon plasma polymer layer.

This type of layer of coating material can be hardened together with the plastics material for the plastics molding and, after peeling of the protective layer system, remains on the resultant plastic component, so that this is ready-coated.

Preference is given to a composite of the invention where the adhesion measured when the protective layer system is released from the hardened plastics component or the hardened semifinished plastics product in a 180° peel test with peel velocity about 120 cm/min, preferably as described in example 4, is ≥0.01 N/cm, preferably ≥0.25 N/cm, more preferably ≥0.35 N/cm, and/or ≤4 N/cm, preferably ≤3 N/cm and particularly preferably ≤2.5 N/cm. Relatively strong adhesion of the plastics film is achieved here by selecting a coating composition which has, within the limits stated above, relatively high oxygen content in comparison with carbon content, like coating 3 listed in the example. In contrast, relatively low adhesion of the composite film is achieved by selecting, for the organosilicon plasma polymer layer, a coating composition which, within the limits stated above, has relatively low oxygen content in comparison with carbon content, like coating 1 listed in the example (see below).

The invention also includes the use of a protective layer system made of plastics film and of organosilicon plasma polymer layer, in particular in the preferred embodiments thereof described above, as release aid in relation to the mold in a plastics-shaping process.

This use can save release agents, and also complicated cleaning steps for the mold and the molded components.

The invention further includes a process for the production of a composite of the invention, comprising the steps of:

a) provision of a plastics film as defined above, b) coating of the plastics film with an organosilicon plasma polymer layer as defined above, and c) bringing the material for the (i) plastics component or (ii) semifinished plastics product in the incompletely hardened state into contact with the organosilicon plasma polymer layer.

It is preferable that the plastics film is first coated with the organosilicon layer before the material for the plastics component or, respectively, the semifinished plastics product is applied to the organosilicon plasma polymer layer.

In one particular embodiment of the invention, a coating material is then first applied to the (preferably formable) protective layer system, and said coating material is optionally partially hardened and then brought into contact with the actual plastics material for the plastics component or the semifinished plastics product. As already indicated above, it is possible to harden the coating material together with the plastics material for the component. It is particularly preferable here that the combination of protective layer system, optionally coating material, and material for the plastics component and, respectively, the semifinished plastics product (matrix material) together provides a (windable) web product in which the matrix material can by way of example be hardened thermally, e.g. after placing into an appropriate mold.

It is self-evident to the person skilled in the art that the existence of the protective layer composite of the invention can continue until the (hardened) plastics component is at its usage site. The protective layer system can thus protect the component during transport and handling, and can be peeled from the component at the latest possible juncture.

The invention is explained in more detail below by means of examples:

EXAMPLES

Example 1

Production of Protective Layer Systems to be Used in the Invention

The (temporary) protective layer system to be used in the invention was produced by providing a plasma polymer coating in a 3 $m^3$ plasma reactor to Walopur 2102 AK 050 thermoplastic polyurethane film from Epurex Films. The film here, width 1600 mm and thickness 50 μm, was passed at a distance of about 40 mm in front of two cooled electroplates each of which measured 500 mm (along the direction of the web)×2300 mm. The plasma process parameters set during the coating process were as follows:

TABLE 1

| Process parameters | | | |
|---|---|---|---|
| | Coating 1 | Coating 2 | Coating 3 |
| Flow rate of $O_2$ gas (Sccm): | 250 | 350 | 450 |
| Flow rate of HMDSO (Sccm): | 250 | 175 | 150 |
| Power (W): | 4500 | 4500 | 5500 |
| Web velocity (m/min) | 2.5 | 2.5 | 2.5 |
| Pressure (mbar): | 0.021 | 0.02 | 0.025 |

Before the process was carried out it was ensured that the rate of leakage (external leaks) of the vacuum chamber used was markedly less than $2\times10^{-1}$ mbar L/s. The operating frequency was 13.56 MHz.

Example 2

XPS Measurements

XPS measurements (ESCA measurements) were made with an Escalab spectrometer from VG. The measurement equipment was calibrated in such a way that the aliphatic Anteil C 1s peak is at 285.00 eV. Because of charge effects it was necessary to shift the energy axis to this fixed value, with no further modification. The analysis chamber was provided with an X-ray source for monochromatic Al Kα radiation, an electron source as neutralizer, and a quadrupole mass spectrometer. The system also had a magnetic lens which focused the photoelectrons through an entrance slit into a hemispherical analyzer. During measurement the normal to the surface was directed toward the entrance slit of the hemispherical analyzer. The pass energy during determination of the atomic ratios was always 80 eV. During determination of the peak parameters the pass energy was always 20 eV.

It was found that, within the bounds of measurement tolerances, the measurement results could be regarded as identical irrespective of whether the coating was measured on the temporary protective film or on silicon wafers as reference material. The results on wafers are shown here:

TABLE 2

| Results of XPS measurements | | | | | | | |
|---|---|---|---|---|---|---|---|
| | O (at %) | C (at %) | Si (at %) | N (at %) | O/Si | C/Si | C/O |
| Coating 1 | 32.1 | 44.6 | 23.3 | 0 | 1.38 | 1.91 | 1.39 |
| Coating 2 | 40.8 | 37.6 | 21.4 | 0.2 | 1.91 | 1.76 | 0.92 |
| Coating 3 | 41.2 | 37.8 | 20.8 | 0.2 | 1.98 | 1.82 | 0.92 |

Example 3

Formability

Formability was determined by subjecting film sections from Example 1 to a forming process in an open mold at room temperature with vacuum support up to a tensile strain value of 250%, and then applying gel coat from Bergolin with the following composition, and hardening for about 3 hours at room temperature:
Steodur PUR GELCOAT Handmasse 6D970-5015-1; 50 g
Steodur PUR HARDNER 7D202; 30 g
Steodur PUR Beschleuniger Blau 6D972-0000; ~1.5 ml
The film sections with the three coatings could then be peeled without difficulty. This was true even for the regions with 250% tensile strain.

Example 4

Adhesion

Bond strengths were moreover estimated by using the two-component epoxy adhesive 2011 Araldite 2000+ from Huntsman to bond the coated films from Example 3 to a glass microscope slide (adhesive joint: 1 mm). After four days of hardening at room temperature, a lateral incision was made in a film strip of width 20 mm, and a spring balance was used to peel the material at a velocity of about 120 cm/min at an angle of 180°. The forces required for this were:
Coating 1: about 0.09 N
Coating 2: about 0.14 N
Coating 3: about 0.12 N As comparison, the same polymer film was also equipped with a coating as in DE 10 2006 018 491 A1. Peeling of the film here required a force of only 0.02 N, whereas the force required for the uncoated film was more than 10 N, and the peeling process here also caused severe plastic deformation of the film.

Bond strengths in relation to an epoxy resin (Cycom 977-2) were estimated by hardening sample sheets made of four layers of the woven-fabric prepreg 977-2A-35-6KHTA-5H-370-T2 from Cytec on the coated film from Example 3 in an autoclave at 180° C. under a gauge pressure of 8 bar. The heating and cooling rates selected for this were respectively 4 K/min and 5 K/min. Between heating and cooling, the temperature was kept at 180° C. for two hours. After cooling to room temperature, a lateral incision was made in a film strip of width 25 mm, and the material was peeled at a velocity of about 120 cm/min in and, respectively, perpendicularly to the direction of the fibers. The forces required for this were as follows:
Coating 1: about 0.03 N
Coating 2: about 0.13 N
Coating 3: about 0.45 N As comparison, the same polymer film was also equipped with a coating as in DE 10 2006 018 491 A1. The force required here to peel the film was only 0.01 N, whereas the uncoated film could not be peeled from the hardened prepreg sheets, but instead tore.

The adhesion on the polymer film with the coating of the invention on the molding is on the one hand sufficiently small that the film can be peeled from the cured molding without difficulty (in particular without tears in the polymer film). On the other hand, the adhesion of the film is sufficiently good to provide effective protection of the molding, and to permit storage or transport thereof, or even mechanical operations thereon, with the protective film of the invention.

In the embodiment of the invention in which external areas of semifinished products are equipped with the release film for the manufacture of fiber-composite components (in particular prepregs), an additional handling cost is moreover saved by laying a release film in/on the mold before the prepreg layers, or the surface master, are/is assembled. This is possible because of the adhesion values in the layer composite.

Example 5

Glassfiber-Composite Component (Rotor Blade) Produced by Infusion Technology Inclusive of in-Mold Coating Before manufacture of an external GRP skin of a rotor blade for wind turbines with the aid of infusion technology, a TPU film of thickness 40 μm in the form of web product, which had been equipped in advance in a low-pressure plasma process on the side facing away from the mold with 20 nm of Coating 2 from Example 1 was placed across the mold, instead of a liquid release agent. Said film is then inserted into the mold by a forming process, and a gel coat based on polyurethane is applied as outer coating material. Directly after application, the outer coating material is predried to a small extent by IR driers, and the laid glassfiber scrim, and also the other manufacturing elements, are placed thereon. Once the usual vacuum has been applied, the fiber material is evacuated, and the epoxy-based matrix resin is injected. The GRP component is then hardened in the usual way by heating, and then removed from the mold with the TPU film. The film remains very substantially as surface protection on the outer coating material until transport to the wind turbine has been completed. Prior to assembly, the film is peeled (e.g. manually). Coating 2 from Example 1 remains entirely on the film here. The surface structure of the matt TPU film provides a matt surface on the hardened external skin of the rotor blade.

Example 6

Filament Winding

Filament winding is used to mold carbon fibers, which during the winding procedure are wetted with an epoxy-based matrix resin, and are then hardened in an autoclave. For demolding without use of release agent, a plastic tube of thickness 60 μm made of TPC and previously provided externally with Coating 3 from Example 1 in a low-pressure web-product plasma process is drawn onto the core before the winding process. After the winding process, a TPC tube of thickness 60 μm which had previously been provided externally with Coating 3 from Example 1 in a low-pressure web-product plasma process was drawn externally over the fibers. The external side of this tube is, however, turned toward the inside. This second tube has regular holes through which excess resin material can escape during the hardening process. After the usual hardening process, the tubes initially still remain as surface protection on the CFC component, and are withdrawn manually only when necessary. All of the Coating 3 here remains on the TPC film. The CFC surface is clean and free from release agents, and can therefore by way of example be coated without difficulty.

Example 7

Carbon-Fiber Composite Component Produced by Prepreg Technology

With use of prepreg technology, preimpregnated carbon fibers which, after production thereof, have been wetted with an epoxy-based matrix resin are placed manually (manual lamination) or by machine (e.g. tape laying, fiber placement) onto or into a mold with release film to be used in the invention (polymer film, protective film), and are then hardened in an autoclave. These preimpregnated semifinished products have to be stored under cold conditions (generally <-18° C.) in order to suppress premature hardening of the matrix resin. For demolding without use of additional external or internal release agents, a 60 μm TPU film which has previously, in the form of web product, been equipped with 50 nm of Coating 2 from Example 1 in a low-pressure plasma process on the side facing away from the mold is drawn into the mold by a forming process so that it is in crease-free contact with the mold surface. The subsequent placing of the prepreg layers takes place in a manner such that the first layer is placed on the coated protective film previously drawn into the mold (temporary) peripheral fixing of the protective film. A procedure that has proven to be helpful here is, in particular during the placing of the first 1-2 prepreg layers. Once the final prepreg layer has been placed, the usual vacuum is applied, and the usual hardening process takes place in the autoclave. After demolding, the TPU film initially still remains as surface protection on the CFC component, and is peeled only when necessary. All of Coating 2 here remains on the TPU film. The CFC surface is clean and free from release agents, and can therefore by way of example be coated without difficulty.

Example 8

Preimpregnated Semifinished Products for the Manufacture of Fiber-Composite Components Semifinished Products for Lightning Protection For the manufacture of a fiber-composite external-skin component using preimpregnated semifinished products for lightning protection (copper mesh), the copper mesh preimpregnated with an epoxy resin is wound onto a roll with a TPU film of thickness 60 μm which in the form of web product had previously been provided on the side facing toward the preimpregnated copper mesh with 60 nm of Coating 2 from Example 1 in a low-pressure plasma process. Said preimpregnated copper mesh is then, with the film, placed into the mold by hand or by machine. Any required overlap of adjacent webs (to ensure conduction of electrical current) is ensured in that either the film in the overlapping marginal region on the upper web is peeled directly before insertion, or said marginal region is not provided with said film. The usual plurality of prepreg layers are then placed on the semifinished product for lightning protection. After the usual autoclave hardening process, the fiber-composite external skin inclusive of the temporary protective film is cleanly demolded from the mold. The temporary protective film initially still remains as surface protection on the CFC component, and is peeled only when necessary.

Example 9

Preimpregnated Semifinished Products for the Manufacture of Fiber-Composite Components: Laid Fiber Scrims A fiber-composite component is manufactured by winding unidirectional epoxy-resin prepreg onto a roll with a TPU film of thickness 60 μm which had previously, in the form of web product, been provided on the side facing toward the prepreg with 30 nm of Coating 2 from Example 1 in a low-pressure plasma process. This prepreg is then placed by machine edge-to-edge as first layer with the film into a mold. Further layers of prepreg without the film are then placed as usual on this first layer. After the usual autoclave hardening process, the fiber-composite external skin inclusive of the temporary protective film is cleanly demolded from the mold. The temporary protective film initially still remains as surface protection on the CFC component, and is peeled only when necessary.

Example 10

Coated Fiber-Composite Component Produced by Prepreg Technology

A coated fiber-composite component is manufactured by using, in the production of the prepreg material, not only the protective film (coated polymer film) to be used in the invention but also a film of coating material (preferably in the form of formable film material) that has not been entirely hardened, arranged between the film and a unidirectional phenolic resin prepreg material. This prepreg structure permits introduction of roll product or panel product into a heated forming mold in which the composite is converted to the final form and hardened.

The temporary protective film protects the surface of the coating during processing and optionally during further processing and/or transport of the component. It moreover ensures that forming molds are clean (without accumulation of release agent), and that a uniform surface of the coating material is obtained by a solvent-free manufacturing process. This is a general feature when the composite of the invention is used in combination with a coating material.

The prepreg material is produced by using a TPU film of thickness 80 μm which, in the form of web product, had previously been provided on the side facing toward the prepreg with a Coating 2 of thickness 50 nm from Example 1 in a low-pressure plasma process. The film of other coating material is applied to said coating. The preimpregnated fiber material is applied to the film of coating material. It is possible here not only to apply unidirectional layers or woven fabrics but also to apply short-fiber material for the production of (quasi-)isotropic fiber-reinforced plastics for example via spraying. The resultant surface is generally protectively covered by a release film or a release paper. If the fiber-composite component to be manufactured is to be manufactured with only one layer of said semifinished product comprising coating material, a further layer of the coated TPU film described above can be used.

After the forming process and hardening process, the TPU film can initially remain as surface protection on the fiber-composite component, and is peeled only when necessary. All of the Coating 2 here remains on the TPU film here. Hardening of the film of coating material and the prepreg material together in the heated forming mold produces a composite with firm adhesion. The extensible protective film is effective in suppressing defects produced by the forming process in the surface of the coating material, and equally traditional coating defects due to dust or to emission of gas from the fiber material.

What is claimed is:

1. An assembly comprising:
   a mold; and
   (i) a plastic component or (ii) a semi-finished plastic product, each of (i) the plastic component or (ii) the semi-finished plastic product having a protective layer system disposed between the mold and (i) the plastic component or (ii) the semi-finished plastic product;
   wherein the protective layer system comprises a plastic film and an organosilicon plasma polymer layer, the plastic film being arranged between the mold and the organosilicon plasma polymer layer and the organosilicon plasma polymer layer being arranged between the plastic film and (i) the plastic component or (ii) the semi-finished plastic product and the plastic film;
   wherein after hardening of (i) the plastic component or of (ii) the semi-finished plastic product, the organosilicon plasma polymer layer adheres more securely to the plastic film than to (i) the plastic component or (ii) the semi-finished plastic product;
   wherein the plastic film comprises a material selected from the group consisting of a thermoplastic elastomer and a thermoplastic polymer;
   wherein the atomic ratios in the organosilicon plasma polymer layer as measured by means of XPS are:

| 1.00 | ≤n(O + N):n(Si) | ≤ 2.20, |
   |---|---|---|
   | 1.20 | ≤n(C):n(Si) | ≤ 2.00, |
   | 0.70 | ≤n(C):n(O + N) | ≤ 2.00; | and
   wherein the plastic film of the protective layer system is adapted for exerting a release effect in relation to the mold such that (i) the plastic component or (ii) the semi-finished plastic product having the protective layer system can be removed from the mold and subsequently the protective layer system can be peeled from (i) the plastic component or (ii) the semi-finished plastic product after the hardening of (i) the plastic component or (ii) the semi-finished plastic product.

2. The assembly according to claim 1, wherein based on the entirety of the elements silicon, oxygen, nitrogen, and carbon as 100 atom %, the following applies to values measured by means of XPS on the organosilicon plasma polymer layer:

| silicon | from 17 to 27 atom %, |
   |---|---|
   | (oxygen + nitrogen) | from 26 to 50 atom %, |
   | carbon | from 25 to 50 atom %. |

3. The assembly according to claim 1, wherein a thickness of the organosilicon plasma polymer layer is 2 μm or less.

4. The assembly according to claim 1, wherein a portion of (i) the plastic component or (ii) the semi-finished plastic product disposed on a side directed toward the organosilicon plasma polymer layer is entirely composed of a material selected from the group consisting of a thermoset, a thermoplastic, a matrix resin for a fiber-composite plastic, a plastic foam, and a lacquer.

5. The assembly according to claim 4, wherein the matrix resin for the fiber-composite plastic is a matrix resin selected from the group consisting of an epoxy resin, an polyurethane resin, a polyester resin, a vinyl ester resin, and a phenolic resin.

6. The assembly according to claim 4, wherein the lacquer is applied in an application selected from the group consisting of a gel coat and an adhesive.

7. The assembly according to claim 1, comprising:
   the plastic component;
   wherein the plastic component has been produced by a process selected from the group consisting of an injection molding, a reaction injection molding process, a foaming process, a fiber-composite material production process, an infusion process, a vacuum infusion process, a lamination process, a manual lamination process, an injection process, a resin transfer molding process, a liquid resin press molding process, a pray layup process, a prepreg process, and an in-mold-coating process.

8. The assembly according to claim 7, wherein the fiber-composite material production process is based on fibers selected from the group consisting of carbon fibers, glass fibers, and polymer fibers.

9. The assembly according to claim 1, wherein the softening point of the plastic film is 100° C. or greater.

10. The assembly according to claim 1, comprising the semi-finished plastic product being in a state which is not yet entirely hardened.

11. The assembly according to claim 10, wherein (i) the plastic component or (ii) the semi-finished plastic product is a web product.

12. The assembly according to claim 11, wherein the web product is a windable web product.

13. The assembly according to claim 1, wherein a material of (i) the plastic component or (ii) the semi-finished plastic product comprises a fiber-composite material.

14. The assembly according to claim 1 further comprising a layer of a coating material adjacent to the organosilicon plasma polymer layer and directed toward (i) the plastic component or (ii) the semi-finished plastic product.

15. The assembly according to claim 1, wherein based on the entirety of the elements silicon, oxygen, nitrogen, and carbon as 100 atom %, the following applies to values measured by means of XPS on the organosilicon plasma polymer layer:

| silicon | from 17 to 27 atom %, |
   |---|---|
   | (oxygen + nitrogen) | from 26 to 50 atom %, |
   | carbon | from 25 to 50 atom %; | and
   and wherein:
   the thickness of the organosilicon plasma polymer layer is 2 μm or less;
   the plastic film is composed of:
      a thermoplastic elastomer selected from the group consisting of a thermoplastic polyester elastomer (TPE-E), a thermoplastic copolyester (TPC), a polyetherester, a crosslinked thermoplastic elastomer based on olefins (TPE-V/TPV), a mixture of polypropylene and ethylene-propylene-diene rubber (EPDM/PP), a thermoplastic elastomer based on urethanes (TPE-U/TPU), a mixture of natural rubber and polypropylene (NR/PP), a mixture of nitrile rubber and polypropylene (NBR/PP), and a mixture of ethylene-vinyl acetate and polyvinylidene chloride (EVA/PVDC), or a thermoplastic polymer selected from the group consisting of a polyolefin, a polymethylpentene (PMP), a polyolefin copolymer, a polyamide, a nylon-6,6, a poly-ε-caprolactam, a polyethylene terephthalate (PET), and a polyimide (PI);

a portion of (i) the plastic component or (ii) the semi-finished plastic product disposed on a side directed toward the organosilicon plasma polymer layer is entirely composed of a material selected from the group consisting of a thermoset, a thermoplastic, a matrix resin for fiber-composite plastics, a plastic foam, and a lacquer;

the plastic component has been produced by a process selected from the group consisting of an injection molding, a reaction injection molding, a foaming process, a fiber-composite material production process, an infusion process, a vacuum infusion process, a lamination process, a manual lamination process, an injection process, a resin transfer molding process, a liquid resin press molding process, a pray layup process, a prepreg process, and an in-mold-coating process;

the softening point of the plastic film is 100° C. or greater;

the material for the plastic component or the semi-finished plastic product comprises a fiber-composite material; and the assembly further comprises a layer of a coating material adjacent to the organosilicon plasma polymer layer and directed toward the (i) plastic component or (ii) semi-finished plastic product.

16. The assembly according to claim 15, wherein based on the entirety of the elements silicon, oxygen, nitrogen, and carbon as 100 atom %, the following applies to values measured by means of XPS on the organosilicon plasma polymer layer:

| | |
|---|---|
| silicon | from 19 to 26 atom %, |
| oxygen | from 30 to 45 atom %, |
| carbon | from 33 to 48 atom %. |

17. The assembly according to claim 1, wherein the atomic ratios in the organosilicon plasma polymer layer, measured by means of XPS, are:

| | | |
|---|---|---|
| 1.25 | ≤n(O):n(Si) | ≤ 2.10, |
| 1.60 | ≤n(C):n(Si) | ≤ 2.00, |
| 0.80 | ≤n(C):n(O) | ≤ 1.80. |

18. The assembly according to claim 1, wherein based on the entirety of the elements silicon, oxygen, nitrogen, and carbon as 100 atom %, the following applies to values measured by means of XPS on the organosilicon plasma polymer layer:

| | |
|---|---|
| silicon | from 19 to 26 atom %, |
| oxygen | from 30 to 45 atom %, |
| carbon | from 33 to 48 atom %. |

19. The assembly according to claim 1, wherein the plastic film is composed of a thermoplastic elastomer is selected from the group consisting of a thermoplastic polyester elastomer (TPE-E), a thermoplastic copolyester (TPC), a polyetherester, a crosslinked thermoplastic elastomer based on olefins (TPE-V/TPV), a mixture of polypropylene and ethylene-propylene-diene rubber (EPDM/PP), a thermoplastic elastomer based on urethanes (TPE-U/TPU), a mixture of natural rubber and polypropylene (NR/PP), a mixture of nitrile rubber and polypropylene (NBR/PP), and a mixture of ethylene-vinyl acetate and polyvinylidene chloride (EVA/PVDC).

20. The assembly according to claim 1, wherein the plastic film is composed of a thermoplastic polymer selected from the group consisting of a polyolefin, a polymethylpentene (PMP), a polyolefin copolymer, a polyamide, a nylon-6,6, a poly-ε-caprolactam, a polyethylene terephthalate (PET), and a polyimide (PI).

21. An assembly comprising:

a mold; and (i) a plastic component or (ii) a semi-finished plastic product, each of (i) the plastic component or (ii) the semi-finished plastic product having a protective layer system disposed between the mold and (i) the plastic component or (ii) the semi-finished plastic product;

wherein the protective layer system comprises a plastic film and an organosilicon plasma polymer layer, the plastic film being arranged between the mold and the organosilicon plasma polymer layer and the organosilicon plasma polymer layer being arranged between the plastic film and (i) the plastic component or (ii) the semi-finished plastic product and the plastic film;

wherein after hardening of (i) the plastic component or of (ii) the semi-finished plastic product, the organosilicon plasma polymer layer adheres more securely to the plastic film than to (i) the plastic component or (ii) the semi-finished plastic product;

wherein the plastic film comprises a material selected from the group consisting of a thermoplastic elastomer and a thermoplastic polymer;

wherein the atomic ratios in the organosilicon plasma polymer layer as measured by means of XPS are:

| | | |
|---|---|---|
| 1.00 | ≤n(O + N):n(Si) | ≤ 2.20, |
| 1.20 | ≤n(C):n(Si) | ≤ 2.00, |
| 0.70 | ≤n(C):n(O + N) | ≤ 2.00; | and wherein the plastic film of the protective layer system is adapted for exerting a release effect in relation to the mold such that (i) the plastic component or (ii) the semi-finished plastic product having the protective layer system can be removed from the mold and subsequently the protective layer system can be peeled from (i) the plastic component or (ii) the semi-finished plastic product after the hardening of (i) the plastic component or (ii) the semi-finished plastic product;

wherein the plastic component has been produced by a process selected from the group consisting of an injection molding, a reaction injection molding process, a foaming process, a fiber-composite material production process, an infusion process, a vacuum infusion process, a lamination process, a manual lamination process, an injection process, a resin transfer molding process, a liquid resin press molding process, a pray layup process, a prepreg process, and an in-mold-coating process;

wherein (i) the plastic component has been produced by the lamination process and (i) the plastic component or (ii) the semi-finished plastic product further comprises a material selected from the group consisting of a wood, a metal and a combination thereof.

* * * * *